United States Patent [19]
Schuermann et al.

[11] 3,894,428
[45] July 15, 1975

[54] MEASURING ANCHORS FOR USE IN MINING

[75] Inventors: Fritz Schuermann, Hattingen, Niederwenigern; Herbert Muller, Essen-Werden; Horst Boddicker, Essen-Kray; Peter-Paul Heusinger, Essen, all of Germany

[73] Assignee: Bergwerksverband GmbH, Essen, Germany

[22] Filed: Feb. 20, 1974

[21] Appl. No.: 439,017

Related U.S. Application Data

[63] Continuation-in-part of Ser. No. 205,576, Dec. 7, 1971.

[52] U.S. Cl. ................................................. 73/88 E
[51] Int. Cl.² ............................................. G01B 5/30
[58] Field of Search ..................... 73/88 E, 89, 88 R

[56] References Cited
UNITED STATES PATENTS

| | | | |
|---|---|---|---|
| 3,416,230 | 12/1968 | Oleson et al. ....................... | 73/88 E |
| 3,481,189 | 12/1969 | Brennan et al. ..................... | 73/88 E |

FOREIGN PATENTS OR APPLICATIONS

| | | | |
|---|---|---|---|
| 226,589 | 6/1959 | Australia ............................ | 73/88 E |
| 1,025,729 | 4/1966 | United Kingdom ................. | 73/88 E |

*Primary Examiner*—James J. Gill
*Assistant Examiner*—Anthony V. Ciarlante
*Attorney, Agent, or Firm*—Malcolm W. Fraser, Esq.

[57] ABSTRACT

A measuring anchor for measuring changes in the area surrounding a mining cavity constitutes an elongate rod-like member rigidly embedded by adhesive in a bore hole of such cavity. On the external surface of the rod-like member are diametrically opposed external recessed portions, such as grooves or flattened portions. Arranged respectively in axially spaced intervals on the outer side of the rod-like member and in pairs opposite each other in the recessed portions are sensors constituting strain gages for measuring changes in the strata surrounding same in several planes distributed over the length of the member. Strips cover the strain gages and are shaped to conform to that of the rod-like member. The sensors have leads which extend to the outside.

1 Claim, 9 Drawing Figures

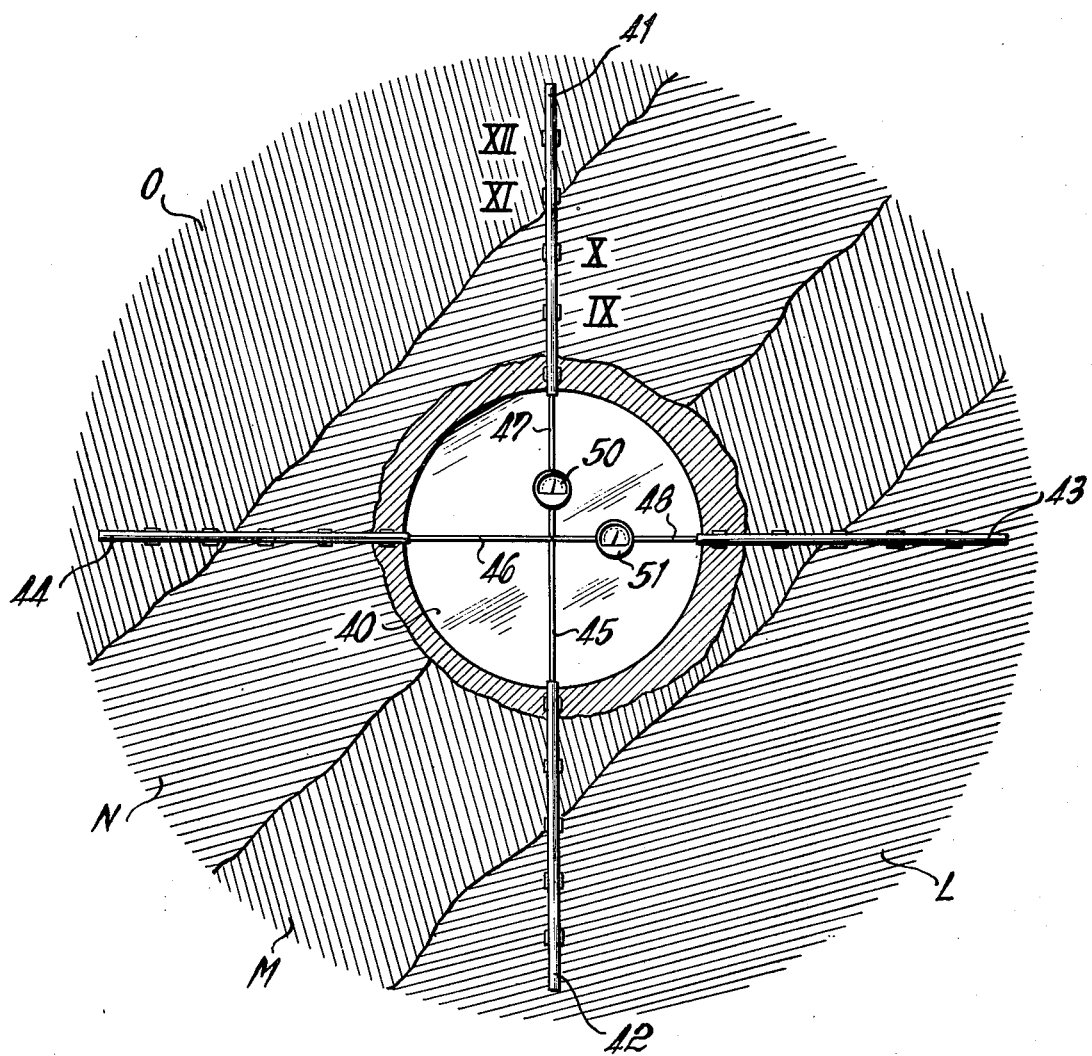

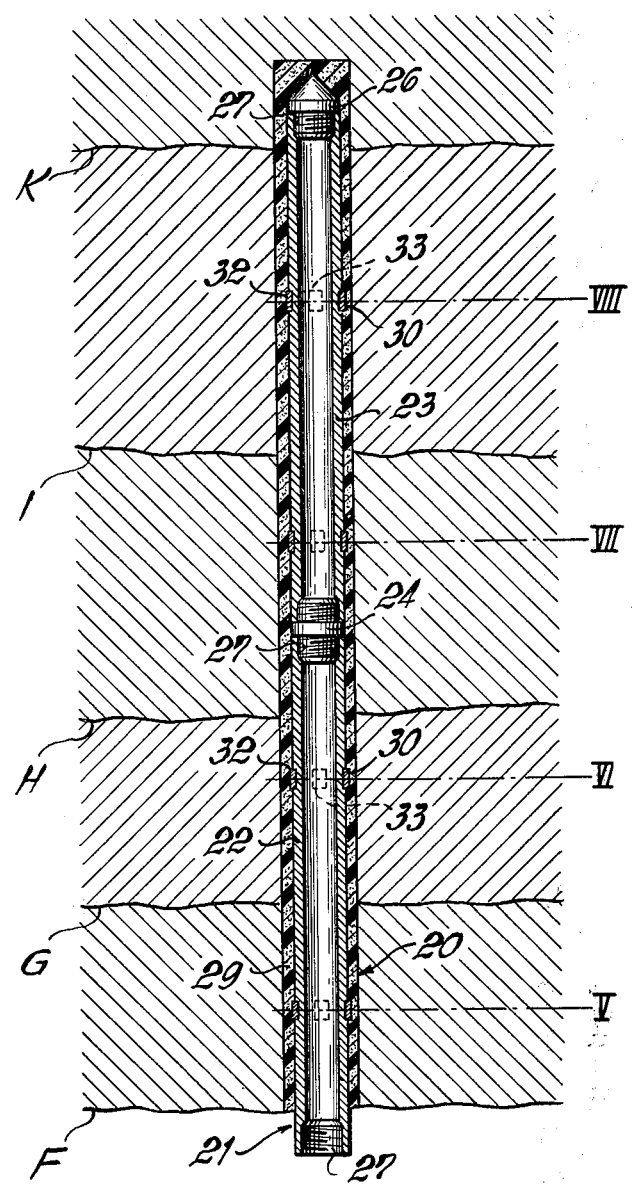

MEASURING ANCHORS FOR USE IN MINING

CROSS-REFERENCE TO RELATED APPLICATION

This application constitutes a continuation-in-part of application, Ser. No. 205,576, filed Dec. 7, 1971.

BACKGROUND OF THE INVENTION

The invention relates to a method for measuring the changes in the formation surrounding a mining cavity by means of measuring anchors.

In mining, and in the construction of underground cavities, e.g. tunnels, water galleries, and the like, the behavior of the formation surrounding the cavity is of interest for widely different reasons, but mainly with regard to the strength of the support for the cavity by means of which the formation may be controlled reliably and durably. In this it is important to detect the different influences which govern the behavior of the formation in each individual case. This also comprises data about the extent of interference with the equilibrium in the formation surrounding the cavity. This interference occurs mainly in consequence of work in opening the space. Of interest is the data about how far destressing movements reach into the body of the surrounding formation. More particularly, as yet there is not sufficient knowledge of to what extent the level of the rock pressure, the capacity of the rock to absorb this pressure resiliently, and the change in the stress distribution in the environment of the cavity as a function of time, and leading to larger rock movements.

Although there are different methods for detecting individual influence values of this type, it may be said that a reliable prediction about the stability of long-life cavities below ground is impossible in the same manner as a prediction about the stability of short life galleries, owing to the multiplicity of types of supports on the one hand, and the plurality of different rock conditions, e.g. types of rocks, effects of formation strata, faults, and the presence of clay materials, as well as water absorption from the air moisture and strength losses within the formation on the other hand. Estimated values are used instead, whereby the formation is classified as stable, loose, pressure resistant, or the like. In accordance with these values, the necessary walling or the support of the exposed formation is fixed empirically.

More particularly, it has hitherto been impossible to measure the behavior of the formation in its interior. For this reason, the effects of changes in the formation are followed up merely by observing the edge of a mining cavity. This may be achieved, for example, by frequent measurements of the cross-section of the cavity, by means of which changes occurring in the course of time or in consequence of mining effects are capable of being approximately detected.

There are attempts at eliminating the defects of these cross-sectional measurements by model trials. These trials have the object of disclosing the phenomena which take place in the formation surrounding a space opened up in the rock or mineral. Owing to the plurality of the influence values or parameters and the absence of knowledge as to how the relevance of the individual parameter is to be assessed, the conditions prevailing in these models cannot be regarded as equivalent. Hence, although model trials have contributed substantially to a better understanding of the behavior of the formation, they have not made it possible to make predictions in particular cases.

For measuring changes in the formation on the site, exfoliating anchors are frequently used. These make it possible to detect changes in rock faces on the faces and in the roof of the underground chamber. To this end, anchors are fixed in the base of drill holes with the tie rod end not tightened in the rock face protruding freely from the rock into the underground chamber. From this, the exfoliation of the rock may be determined as a sum value which represents the relative movement of the rock along the tie rod. With this principle, a loosening of the formation may be measured with an accuracy of about 1mm. Since this method yields sum values which represent the loosening of the body of the surrounding formation in the depth measured by the anchor in its totality, there is a possibility of measuring the exfoliation of the formation in steps, by using several anchors of different lengths. The so-called extensometers are based on the same principle.

These methods are very expensive in view of the plurality of exfoliation armatures required in each individual case, and the connected number of measuring processes, but are also too inaccurate because they enable only the detection of the exfoliation of the rock strata, but not their mutual displacements. Although the use of endoscopes offers possibilities in this respect, the application of these measuring instruments requires further drill holes which substantially increase the expenditure for carrying out these measurements.

SUMMARY OF THE INVENTION

The invention has the object of making possible the detection of changes inside a formation surrounding a mining cavity with sufficient accuracy by means of only a few measuring anchors, and of providing the conditions whereby the results gained by these measurements may be combined with measurements of changes of the rock body along its boundaries towards the cavity, and to compare them.

According to the invention, the new method consists in that the changes in the formation strata surrounding the measuring anchor may be measured in several directions over the length of measuring planes of each armature. Measurement is effected in each measuring plane in two mutually perpendicular directions. The tie rods are firmly connected to the rock by adhesion.

According to a further feature of the invention, the determination of the elongation measuring values is completed by detecting the convergence of the formation in the underground chamber in a direction defined by two coaxial and mutually facing measuring anchors.

The evaluation of the measuring values gained in the measuring planes shows the effects of the strata picture and of any loosening surfaces in the rock body, because not only exfoliation of the strata but also their mutual displacements can be observed in the rock anchor. This is achieved with a very high degree of accuracy. If, for example, the measuring planes are fixed with the tie rod at a distance of 30 to 50 cm an accuracy of the order of about 1/100 mm per metre tie rod length can be achieved. Since the time function of the changes may be detected simultaneously, a correspondingly accurate statement may be made after a short time with regard to how and with what speed movements in the formation start and take place at certain selected points.

If the measuring method, according to the invention, is used in its extended form, it yields simultaneously information about the convergence of the formation, and thus about the causes of the convergence to be looked for in the formation. The arrangement of the anchors may be such that the two measuring anchors are in the roof and in the base of the underground chamber.

The method according to the invention may be expanded to produce a close measuring system. To this end, the movements of the strata and the convergence of the cavity are detected sumultaneously in several directions defined by the measuring anchors. These directions may also extend in angles to each other.

In this manner, it is possible with comparatively little expenditure to detect the dimension and the speed of changes in the roof, in the base, and in the faces or sides of the underground chamber by means of loosening, compaction and shifts occurring in the depth of the formation, according to direction and size. The shape and magnitude of the loosening zone make it possible to arrive at conclusions about the ratio between the vertical and the horizontal rock pressures.

The advantage of this method consists in the fact that the obtained measuring results supply sufficient data about the behavior of the formation within the shortest possible time, enabling the optimum support structure to be established for an intelligent cost. When the support has been mounted, the measuring arrangement may be used for detecting the interactions between rock and support within a few days. This possibility is due particularly to the extraordinary high measuring sensitivity with which changes in the rock body can be detected. These measurements may also be continued over longer periods, with a view to obtaining scientifically evaluable data about the behavior of different types of support in comparable formations. This is due on the one hand to the particular action of the adhesive anchors used in accordance with the new method, because the adhesion not only protects the measuring value transmitter, but also transmits the movement of the rock almost without loss to the tie rod, and translates it there into measuring values which can be detected and transmitted by the measuring value transmitters.

The present invention also provides a measuring anchor for measuring changes in the formation surrounding a mining cavity, said anchor comprising a tie rod having external recessed portions, strain gages located in said portions, strips covering said strain gages and recessed portions, and leads extending from said strain gages and located in said recessed portions.

The use of strain gages makes possible the desired measurements with extraordinary precision. For this reason, the high measuring sensitivity of the strain gages permits not only the early detection of changes of the formation, but also a very accurate prediction of the behavior of the formation on the basis of these measurements. This may be used, e.g., for determining an optimum development. Strain gages with electrical measuring ranges between 120 and 600 ohms have proved successful. They are evaluated in electrical measuring bridges, and this arrangement may be mounted remotely from the measuring position.

The arrangement of strain gages on the tie rod makes it possible to clarify the behavior of the rock locally and qualitatively, and the introduction of a time measurement also makes it possible to determine the speed of movements in the formation. The length of the tie rods enables determinations about the depth at which, or the distance up to which such changes take place in the rock. To this end, tie rods may have lengths from 4 to 7 metres.

The strain gages of one plane are offset relative to each other, e.g., through 180°. By forming the arithmetic mean from the strain gages of one plane, a fairly exact reproduction of the elongation or contraction of the tie rod is obtained. For this purpose, a temperature transmitter may be used in order to provide a correction. If the difference between both strain gages is found, a qualitative and a quantitative statement is possible about the bending of a tie rod. If the measured elongations or contractions are multiplied by the partial length of the tie rod, located between the planes defined by the strain gages, the total elongation of the tie rod on this partial length may be calculated. The overall elongation of the tie rod results obviously from the addition of the elongations of the partial lengths.

In this manner, displacement within the surrounding formation may be measured, which appear in the form of elongations or contractions of the tie rod. In addition, it is possible to determine where these changes in the length take place. If, in addition, the measuring tie rods are constructed in the same way as the tie rods used for mining the formation, it is possible to determine the behavior of the mining tie rods.

However, if only the rock behavior is to be detected as accurately as possible, tie rods with little distortion resistance are used, e.g., tubes. In this manner it is possible, for example, to measure the "sag" between two supporting points of a formation.

Preferably, the strain gages have a range, corresponding to about 3 percent elongation. In a formation in which a mining cavity is located, changes are, however, also of interest, if they exceed this value. The invention has, therefore, the further object of extending the present measuring range limit substantially towards higher elongation values by preventing the premature destruction of the strain gages, their contacts with the electric leads, and of the cables containing the lead wires, and of ensuring that, in the case of larger elongations, the covers provided for protecting the measuring arrangements do not become loose or lost.

Preferably, the strain gages have a measuring range of more than 3 percent and up to 30 percent, and a mounting is provided on the tie rod behind the strain gages, for the leads, having a corresponding length, a layer being provided, between the cover strips and the strain gages, consisting of a durably elastic and water-sealing material, and extending at least to the cable mounting.

Elongations of the tie rod, measurable above 2 to 5 percent, owing to the construction according to the invention, trigger off with all possible tie rod materials transverse contractions which lead to the measuring rod becoming detached from its adhesive which connects it to the rock. This is not undesirable, because it ensures the uniform elongation of the tie rod. On the other hand, care must be taken for the tie rod to remain connected to the rock at the reference points.

For this reason, the tie rod is preferably constructed in such a manner that its anchoring rod has, between the measuring planes in which the strain gages are arranged, ribs or threads for additionally fixing the tie rod in the adhesive connecting it to the rock. In this way it becomes possible to fix not only the two ends of the measuring rod, but also the parts between the measuring planes by means of an outer profile, in the adhesive in such a manner that the reference points cannot become displaced relative to each other, without the strain gages indicating such a displacement.

The tie rod must naturally be capable of withstanding an elongation corresponding to the strain gage without undergoing in this zone a non-uniform restriction. According to the invention, various materials are suitable for this purpose, namely, pure aluminium, lead, or a synthetic or natural rubber filled with metal powder.

The cover which protects the strain gages against external influences during transportation, and during the installation of the measuring anchor, must not be directly joined to the strain gage with this large measuring ranges. This is the purpose of the intermediate layer. Since the electric measuring arrangement is sensitive to water and is in the strongly extended state after loosening of the formation, a watertight seal must exist even under these conditions, especially with anchors mounted in the base of the cavity. For this reason, a particularly suitable material for the intermediate layer is a silicone rubber.

BRIEF DESCRIPTION OF THE DRAWINGS

The invention will now be further described by way of example, with reference to the accompanying drawings, in which:

FIG. 2 shows the arrangement of several measuring anchor rods for carrying out the measuring method according to the invention, extended by the convergence measurement;

FIG. 3 is a longitudinal section of a measuring anchor tube for measuring at larger distances from the cavity within the formation;

FIG. 3a is a transverse sectional view through certain strain gages of FIG. 3;

FIG. 4 is a cross-section of yet another measuring anchor;

DESCRIPTION OF PREFERRED EMBODIMENTS

Figure 1:
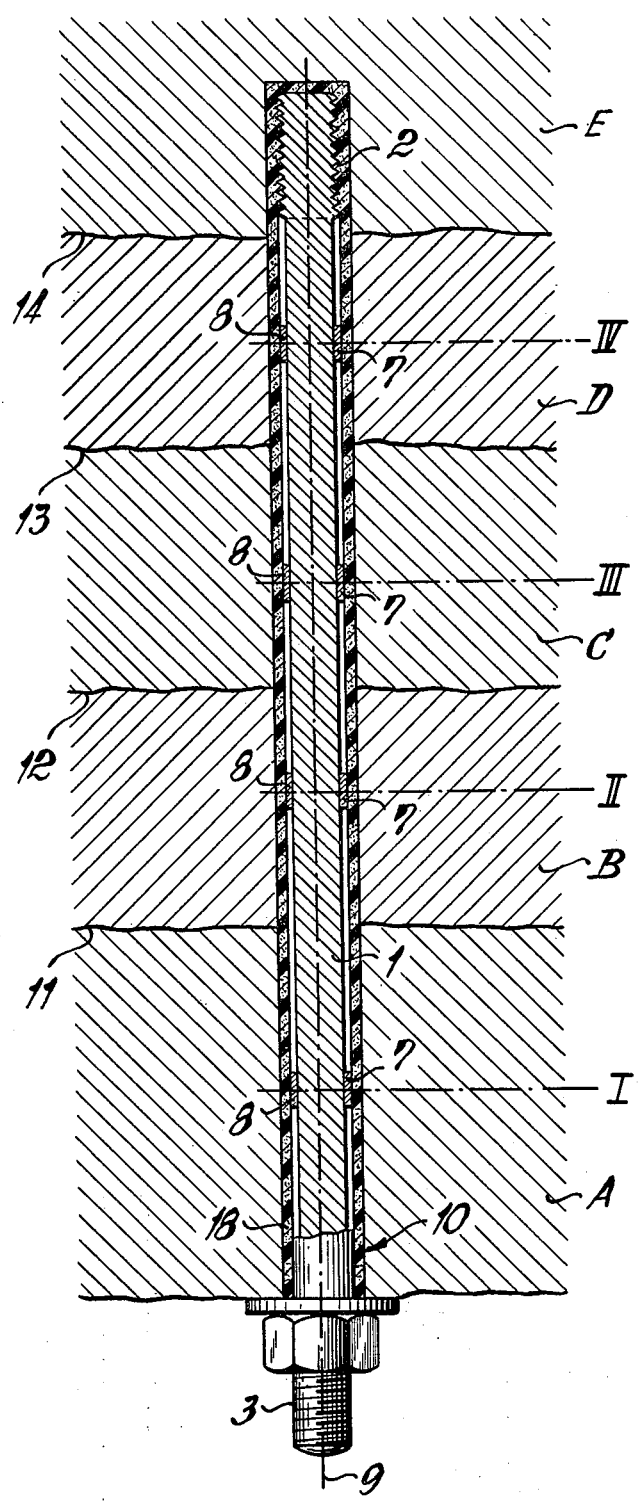
FIG. 1 shows one embodiment of a measuring anchor rod for carrying out the measuring method according to the invention in longitudinal section, and diagrammatically the rock strata detected by the anchor.

The measuring anchor shown in FIG. 1 has an elongate cylindrical tie rod 1, the length and thickness of which is fixed on the site in accordance with the local conditions. The tie rod is threaded at its inner end 2 and at its free outer end at 3. Between the ends of the thread, the surface of the tie rod is not smooth. However, it can have a profile in order to improve its adhesion in synthetic resin and in the rock.

Figure 1A:
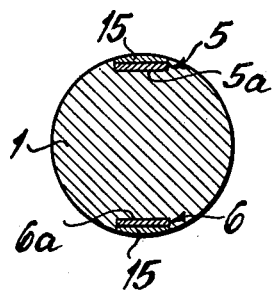
FIG. 1a is an enlarged transverse sectional view through the measuring anchor rod of FIG. 1 in the region of certain strain gages.

As may be seen from the cross-section shown in FIG. 1a, the tie rod 1 has two longitudinal grooves 5 and 6, offset relative to each other by an angle corresponding to a half circle. In the embodiment of FIG. 1, strain gages 7 and 8 are fitted into the grooves 5 and 6, respectively, at regular intervals. In this manner, planes I to IV are distributed over the length of the measuring anchor. In each of the measuring planes thus provided, there are strain gages 7 and 8. The strain gages are mounted opposite each other in pairs. The longitudinal change in the neutral fibre of the tie rod may be determined by forming an average value. By forming the difference of the measuring values, the bending of the tie rod in direction and in absolute value is obtained. From these values, the absolute magnitudes and the directions of displacements may be determined which occur in the rock strata.

With the embodiment shown in FIG. 1, the strain gages 7 are so offset relative to the strain gages 8 that two mutually perpendicular directions are thereby defined. One direction coincides with the axis 9 of the tie rod or of the bore hole 10, in which the tie rod 1 is mounted. The second direction is perpendicular to the direction indicated at 9. In consequence, the exfoliation of the strata A to E may be determined by the strain gages 7, and the shift of the strata along the boundary faces 11 to 14 by means of the strain gages 8.

The strain gages 7 and 8 are located on the base 5a and 6a, respectively of the grooves 5 and 6, and are covered with sheet metal strips 15. These metal strips also cover the leads, not shown, to the strain gages. After the fitting of the strain gages, the sheet metal strips are again curved or rounded so that the surface is restored to the original configuration which the anchor had prior to the machining in of the grooves 5 and 6.

The tie rod is retained in the drill hole 10 by means of a plastic glue of known kind, the glued joint being shown at 18. The adhesive may be inserted by subsequent injection, or else by using an adhesive cartridge and the adhesive preferably comprises a synthetic resin.

The adhesive anchor shown in FIG. 1 corresponds to the anchors usual in anchor supports, so that with the arrangement of FIG. 1, only the formation behavior in the anchor zone can be measured.

Figure 1B:
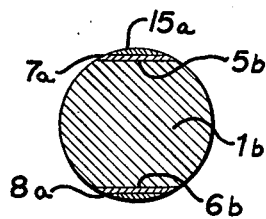
FIG. 1b is an enlarged transverse section similar to FIG. 1a but instead of showing grooves as in the latter, showing flattened areas on the surface of the rod or measuring anchor for the sensors.

According to FIG. 1b, flattened surfaces 5b are provided instead of the grooves or milled recesses as shown in FIG. 1a. The flattened surfaces 5b are adapted to receive sensors 7a and 8a on opposite sides of the anchor rod 1b and metal cover strips 15a similar to the strips 15 above described. Thus, the grooves 5 and 6 or the flattened surfaces 5b and 6b provide shallow external recessed portions to receive the respective sensors which are covered by strips 15a as in FIG. 1b, or strips 15 as in FIG. 1a. These recessed portions may be continuous throughout the length of the rod-like member 1, or alternatively they may be extended only for the length of the respective strain gages.

In the embodiment of FIG. 3, an anchor is used which projects into deeper layers of the rock. As shown, the layers of the rock are shown at F to K, through which a drill hole 20 extends. A measuring anchor 21 is assembled from two partial lengths 22 and 23. These consist of tube sections which are interconnected by a sleeve 24. The partial section 23 which is deepest in the drill hole 20, is closed at its inner end with a plug 26 which is screwed into the internally threaded end of the tube 23. The second tube section 22 may be pushed in for connection with the sleeve 24 and thus also with the tube 23. For this reason, the tube section 22 has an internal thread 27 at both ends, enabling further lengths to be connected by means of sleeves 24 as required.

In this measuring anchor, assembled from tube sections 22 and 23, strain gages 30 to 33 are stuck or welded into milled recesses on the outside of the tubes. Leads to the strain gages pass through the interior of the tube, but are not shown in FIG. 3.

As in the embodiment of FIG. 1, the strain gages are arranged in measuring planes V to VIII. Always two strain gages, namely the strain gages 30 and 32, or 31 and 33, respectively, are mounted opposite each other, and at an offset of 90°. This provides a possibility of determining in each measuring plane V to VIII not only the longitudinal changes, but also the bending of the tie rod in two planes, thus making it possible to determine the main direction of shift in the rock.

Every partial anchor section 22 or 23 has at its lower end a plug, not shown, in which terminate the leads to the strain gage. The following section of the measuring anchor has a cable or lead to this plug. In this manner, a plurality of strain gages may be connected through plugs. This has the advantage that during the driving in of an anchor consisting of several parts, and mounted in accordance with the adhered anchor principle, the plug joints are not damaged. The adhesive layer is shown at 29 in FIG. 3.

The plug joints are commercially available and are not shown for this reason in the drawings. In principle, they differ according to whether they are pushed from the outside on the tie rod or are in its interior. This will depend on whether the anchor is a solid anchor, as shown in FIG. 1, or a composite hollow anchor as shown in FIG. 3.

With the measuring anchors above described, a measuring system may be established of the kind shown diagrammatically in FIG. 2. In this embodiment, it has been assumed that a circular cavity 40 has been driven into a mountain having the rock strata L to O. In the roof there is a tubular measuring anchor of the type shown in FIG. 3, and indicated at 41. A similar measuring anchor 42 is provided in the base of the cavity and arranged in axial alignment with the anchor 41. In addition, mounting anchors 43 and 44 are axially aligned and are adhered into both sides of the cavity and perpendicular to and corresponding to the anchors 41 and 42. If the drill holes for mounting the adhered measuring anchors 41 to 44 are made with a core drill, it is possible to determine simultaneously the construction of the mountain, i.e. its composition in the layers L to O and the rock properties in these layers. The measuring planes are marked on each measuring anchor with the numbers IX to XII, where strain gages are mounted respectively.

Thin tubes 45, 46, 47, and 48 are pushed into the anchors 42, 44, 41, and 43 respectively, and fixed therein. The tubes terminate in convergence transmitter units 50 and 51, one of which is associated with two coaxial anchors 43 and 44, and the other with anchors 41 and 42.

The values provided by the strain gages are recorded as known in the art. Required are a measuring position switch for selecting the various strain gages, and the balancing of the selected strain gage by means of a measuring bridge.

The measuring value can be determined manually on the site by simple reading devices. A higher degree of rationalisation is obtained by an automatically operated selecting installation, which may be positioned in the vicinity of the measuring system or directly on the site. It is also possible to transmit the measured values after amplification through the telephone network to above ground, e.g. into a central control room.

According to FIG. 4, the construction of an adhered anchor 69 is such that the longitudinal change of the tie rod may be measured directly in the neutral zone 60. To this end, the anchor has an axial groove 61 formed with a bottom wall 62 receiving a strain gage 63. A seal 70 closes a cavity 64, which is adapted to receive the strain gage and connecting cables or wires 65. The recess 64 is closed with an insert 66 which is adhesively connected at 67 and 68 to the sides of the recess.

Figure 5:
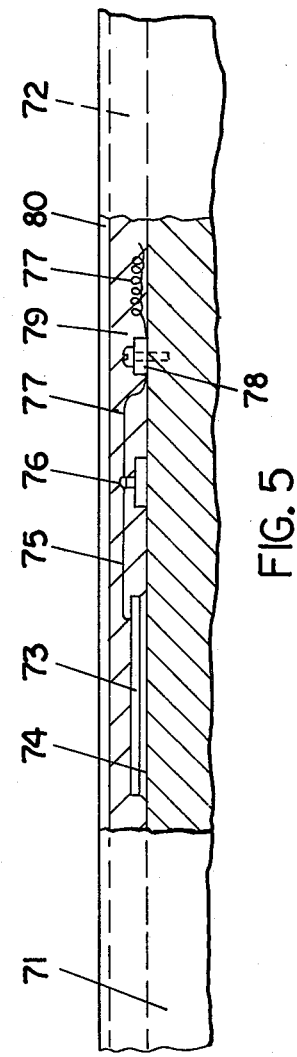
FIG. 5 is a fragmentary sectional view of a further embodiment of a measuring anchor for reproducing a strain gage arranged in one measuring plane with its electric leads.

The measuring anchor shown in FIG. 5 comprises a tie rod 71 provided with a groove 72. On the bottom of the groove is mounted an electric strain gage 73 by means of a layer of adhesive 74. Leads 75 are connected to the strain gage and are mounted on soldered supports 76. Leads 77 extend between the soldered supports 76 and cable clips 78 which hold the leads in front of the soldered supports 76. This is achieved in such a way that the soldered supports are protected against all tensile stresses.

The leads 77 are positioned behind the cable clip 78 in several turns or spirals. In this manner, the cables can follow the elongation of the tie rod in accordance with its lengthening without thereby suffering damage.

The arrangement in the groove, just described, is completely covered by a durably elastic, moisture-insulating intermediate layer 79. Its outside is covered by a metal strip 80 which is connected to the groove edge. The means used for this purpose are not shown in the drawing.

Figure 6:
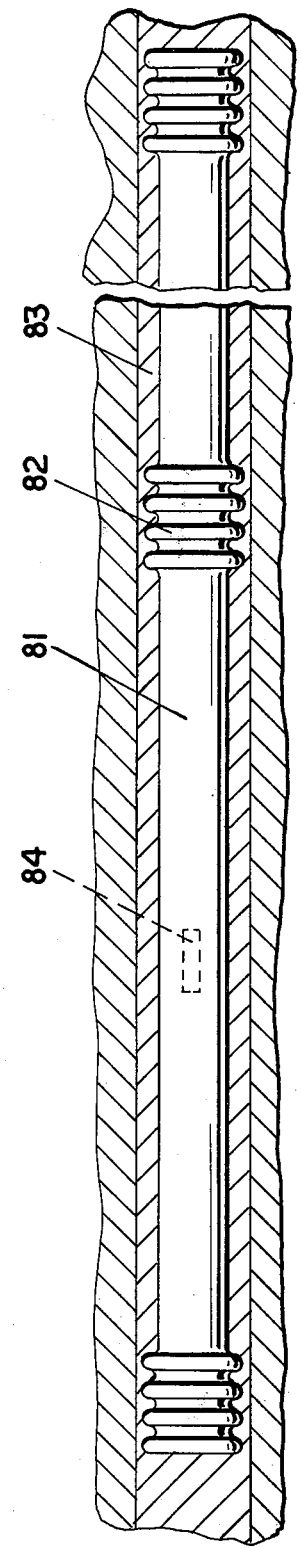
FIG. 6 shows a fragmentary sectional view on a smaller scale of a measuring anchor shown in FIG. 5 arranged in a drill hole in the formation to be measured.

As shown in FIG. 6, the continuous section of the measuring elongations is possible between 0 and 30 percent. At its ends, the measuring rod 81 is connected in a locking manner with an adhesive filler mixture 83, by means of transverse grooves 82, in this embodiment formed by threads, between the strain gages or the pairs of strain gages offset through 180°. If the formation loosens between two such externally ribbed parts of a tie rod, the smooth portion of the tie rod, located between these zones, is stretched. This takes place in such a way that the adhesive effect in the section 81 of the tie rod, and in the associated section 83 of the adhesive layer is not initially lost. Only when the elongation becomes larger, e.g., exceeding about 2 percent and more, does transverse contraction occur. At elongations above 5 percent the section 81 becomes detached from the adhesive filler mixture 83. Then, the strain gage measures with great accuracy the mean elongation on the section 84 between the fixed points defined by the outer ribbing. The tie rod preferably consists of aluminium, a material which can withstand elongation of up to 10 percent.

What we claim is:

1. In a measuring anchor for measuring changes in the area surrounding a mining cavity in which the anchor is rigidly embedded in a bore hole of such cavity, the improvement comprising an elongate rod-like member constituting the measuring anchor, said rod-like member comprising a cylindrical rod provided with diametrically opposed external recessed portions, sensors on said rod-like member arranged respectively in axially spaced intervals and on the outer side thereof for measuring changes in the strata surrounding same in several planes distributed over the length of said member, said sensors constituting strain gages arranged in pairs in opposite recessed portions respectively in axially spaced relation over the length of said rod-like member, sheet metal strips covering said strain gages respectively and curved to conform to the shape of said rod-like member, and leads from said sensors contained within the confines of said rod-like member adapted to extend to the outside for enabling detection of dimension and speed of changes in the strata, whereby the exterior surface of the measuring anchor is relatively smooth for enabling free insertion into the bore hole.

* * * * *